United States Patent Office 3,517,283
Patented June 23, 1970

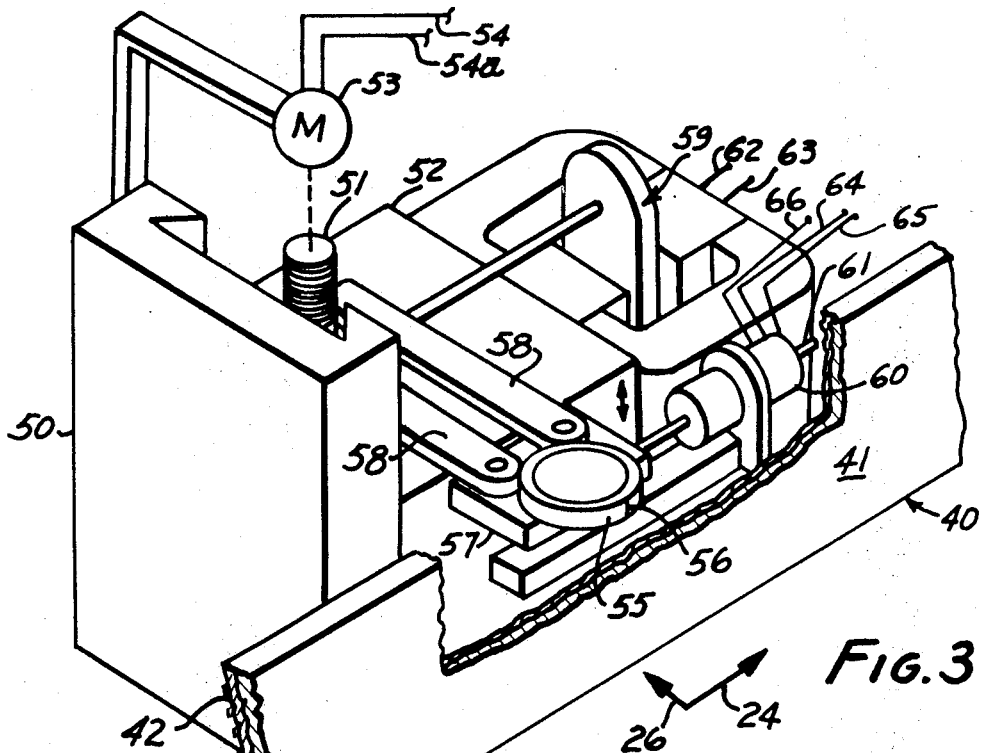
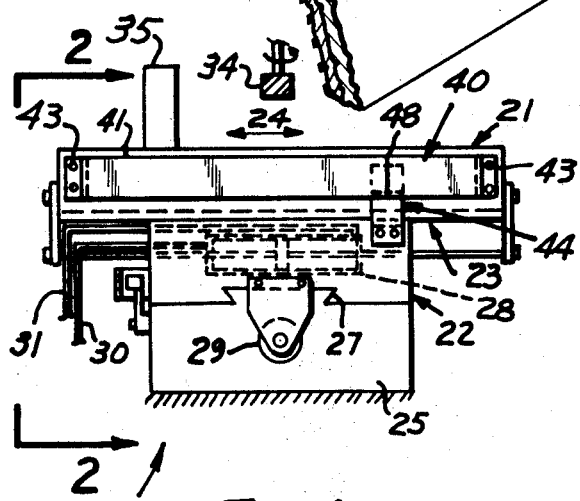
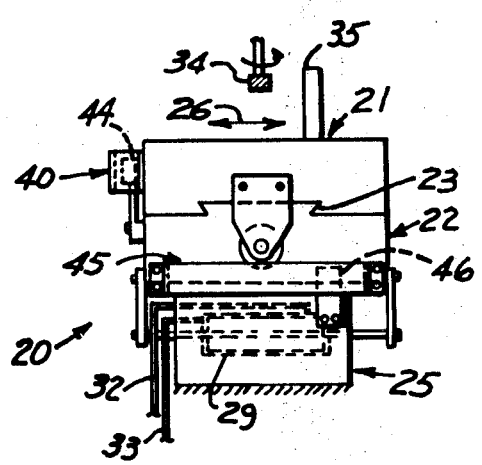
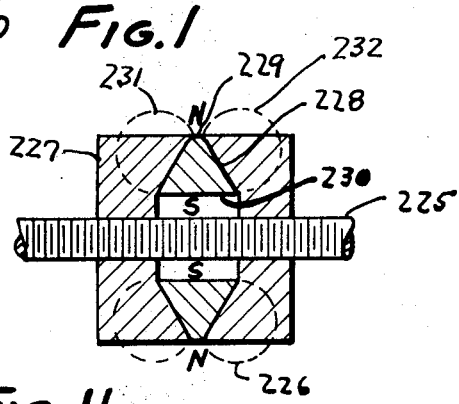

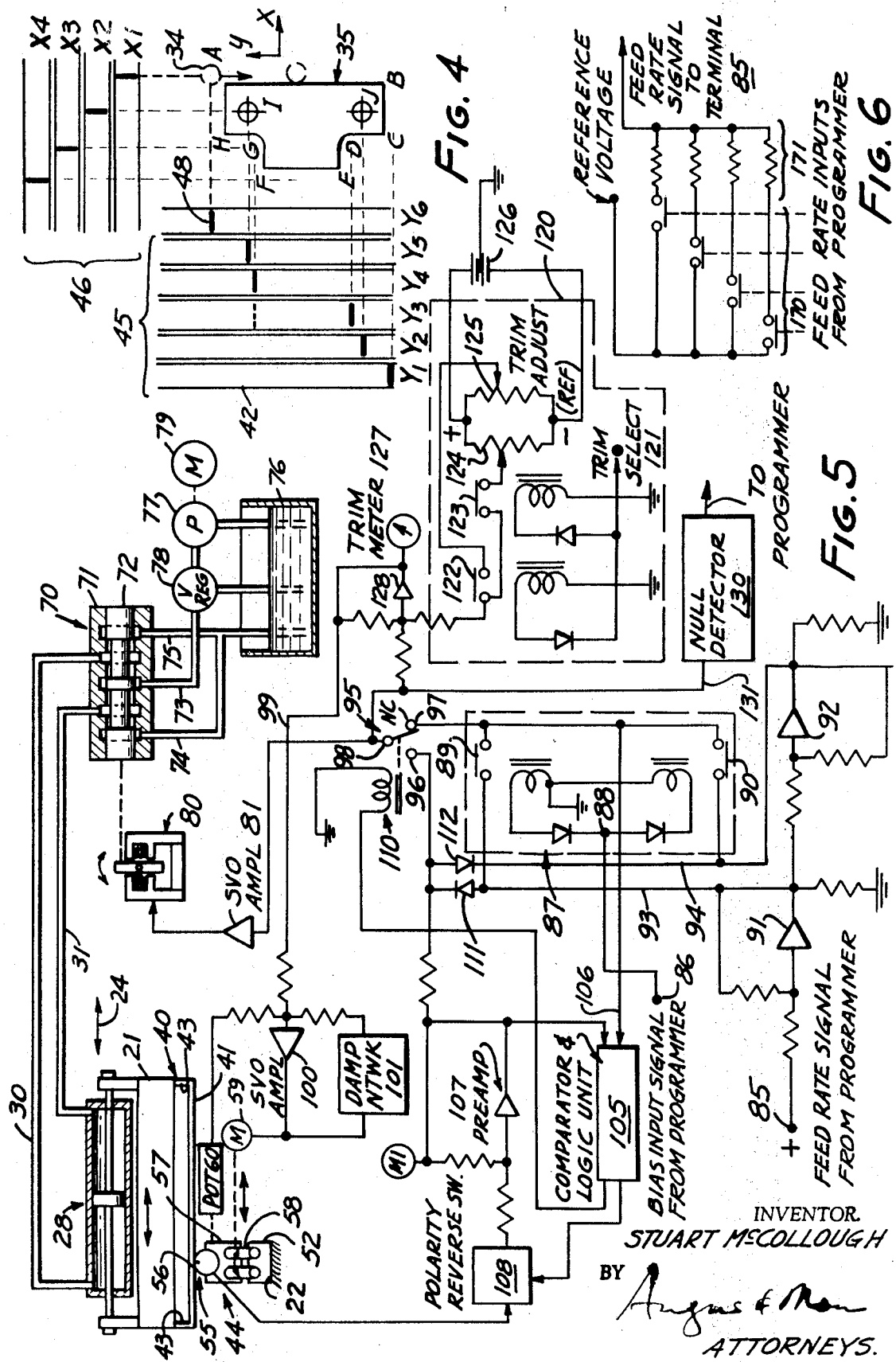

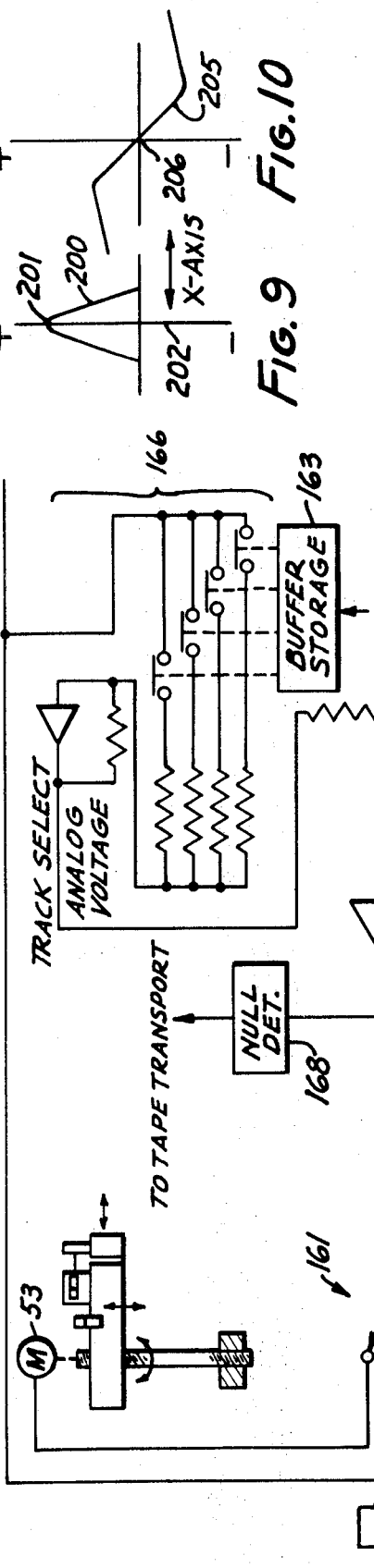
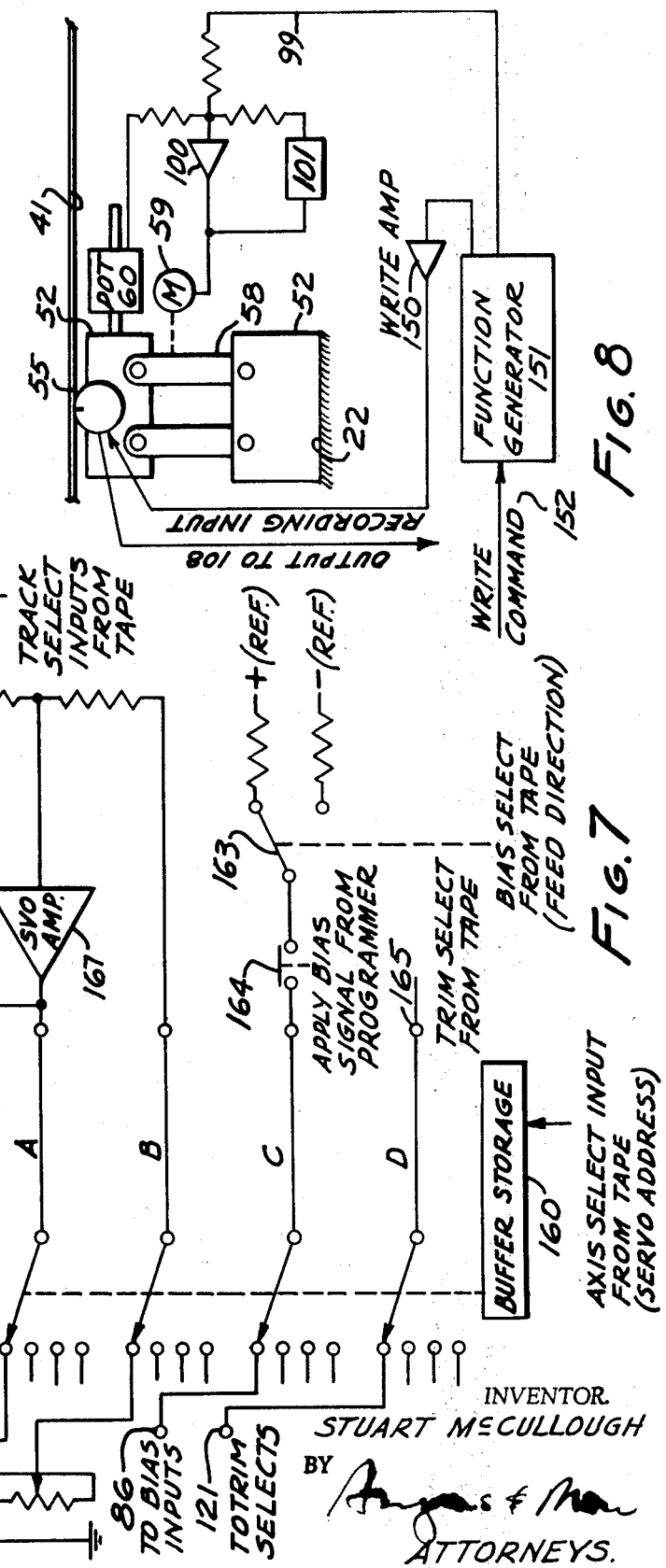

3,517,283
MACHINE TOOL CONTROL
Stuart McCullough, Covina, Calif., assignor to True-Trace Corporation, El Monte, Calif., a corporation of California
Filed July 20, 1967, Ser. No. 654,908
Int. Cl. B23q *15/00;* G05b *19/20*
U.S. Cl. 318—18               11 Claims

ABSTRACT OF THE DISCLOSURE

This invention relates to machine tool controls and especially to a control for that class of machine tool in which two members such as a ways and a slide are relatively moved by a motive means along an axis in order to establish the relative position of a cutting tool and a workpiece. The control includes data means carried by one of the members and adapted to bear data relating to a datum location, a static-reading means on the other one of the members adapted to sense data of the discriminator class on the data means and to produce a signal indicative of the adjacency thereof, and control means responsive to the signal for controlling the power means in response thereto.

According to an optional feature of the invention, one of these means is so disposed and arranged that the sensor means and/or the data are movable with respect to their points of attachment to the machine tool during relative motion of the members, whereby to anticipate the adjacency of the sensor means to the datum location, and also control circuitry effective on the motive means and on the shifted means to return the shifted means to the datum location and to decelerate the member at a proportional rate.

---

This invention relates to a control for that class of machine tool which includes relatively movable members such as a ways and a slide that are used to position a cutting tool relative to a workpiece. Examples are mills and lathes.

An objective of this control is to enable a programmed operation to be accomplished with such precision as to manufacture many types of parts without supervision by the operator or the use of such auxiliary devices as tracer valves and tracer systems.

It is a further object of this invention to utilize such a control not only to determine the direction and extent of operation, but also its feed rate.

It is an optional object of this invention to utilize data means and sensor means which are readily applicable to many existing machine tools, and on which data can readily be applied. Such data means may be removed as a piece of tooling until it is once again desired, at which time it can again be applied to the machine tool.

It is another optional objective of this invention to provide control circuitry and means whereby the sensor means and the data may be shifted by shifting means toward one another, thereby to provide means for anticipating the arrival of the sensor means at adjacency of some datum location, whereupon control over the motive means which drives the machine tool member and also control over the shifting means is assumed by the control circuitry, which circuitry decelerates the member prior to its reaching the datum location, rather than requiring an abrupt stop at a high deceleration rate or tolerating overtravel.

This invention is described in combination with that class of machine tool which includes a ways member and a slide member, the slide member being mounted to the ways member for motion relative thereto along an axis, but not laterally thereto. It will be appreciated that it could be applied to other geometries, as for example, a rotary table, and the terms "slide" and "rotary table" are intended to be equivalents. Relative movement of the members affects the relative position of a cutting tool and a workpiece along a parallel axis. This motion is caused by motive means.

The invention includes data means carried by one of these members, which data means includes a body adapted to carry data in the form of a detectable physical property having discriminator characteristics at a selected datum location thereon. A static-reading sensor means is carried by the other of said members and is so disposed and arranged as to move in adjacency to the data means when the members are relatively moved. The sensor means is adapted to sense the adjacency of the data and to provide a signal indicative of said adjacency of data. Control means is provided responsive to the signal for controlling the motive means in response thereto.

According to a preferred but optional feature of this invention, the data means comprises an elongated track of magnetizable material and the sensor means comprises a static-reading Hall effect head.

According to still another preferred but optional feature of the invention, one of the means is mounted to a shifting means whereby to be advanced toward the datum location in order to provide an anticipation of the arrival at the datum location, thereby to provide for deceleration of the device near the end of its travel. This enables the device to operate with improved standards of accuracy and servo performance.

The above and other features of this invention will be fully understood from the following detailed description and the accompanying drawings, in which:

FIG. 1 is a fragmentary side view of a machine tool including the invention;

FIG. 2 is a side elevation taken at line 2—2 of FIG. 1;

FIG. 3 is a perspective view of a portion of FIG. 1;

FIG. 4 is a plan view of a part adapted to be made by the machine of FIG. 1 illustrating the inclusion of certain data means therein;

FIG. 5 is a schematic diagram, partly in mechanical and partly in electronic notation, illustrating the control circuitry of the invention;

FIG. 6 is a diagram, partly in mechanical and partly in electrical notation, illustrating certain auxiliary equipment for use in the device of FIG. 1;

FIG. 7 is an electrical schematic diagram showing a selector means useful with the circuit of FIG. 5;

FIG. 8 is a view, partly in mechanical and partly in electrical notation, illustrating a circuit and device suitable for applying data to the data means of FIGS. 1 and 3;

FIGS. 9 and 10 are plots of typical data and corresponding discriminator characteristics; and FIG. 11 is an axial view partly in cross-section, showing another data means.

FIG. 1 illustrates a machine tool 20 of the class in which this invention finds its primary application. The machine tool includes a slide member 21 which will be recognized as a typical milling machine worktable which rests atop a ways members 22, the two being joined by a typical dovetail ways system 23 in order that the slide member may reciprocate along axis 24 relative to its underlying ways member.

The underlying ways member 22 will be recognized as a typical cross slide of a milling machine which rests atop a base member 25, the base member resting on the floor. Ways member 22 in this case becomes a slide member relative to base member 25, sliding along axis 26 and carrying the slide member 21 with it by means of a second dovetail ways system 27. Motor 28 drives slide member 21 relative to its ways member, and motor 29 drives member 22 relative to member 25. For convenience, these motors are shown as conventional hydraulic cylinders (which include a cylindrical chamber in which a piston reciprocates) with conduits 30, 31 providing power connection for motor 28, and conduits 32, 33 providing power for motor 29. Motion along the respective axes is caused by flow of fluid through these conduits. Were the motors to have been electrical types, these conduits would instead have been electrical leads.

In this type of device, it is common to move the milling machine table under a milling cutter 34 in order to cut a workpiece 35 to size or shape. The workpiece will customarily be attached to the top of slide member 21 for this purpose. This being a standard milling machine arrangement, no further details will be given except to point out that it represents only one of numerous machine tool applications in which two machine tool members are relatively shiftable to one another in order relatively to position a workpiece relative to the cutter.

A control for this invention includes certain elements which are best shown in FIGS. 1–30. In the specification to follow, the controls related to slide members 21 and 22 will be described in full detail, and the others will merely be generally referred to, it being recognized that these others are duplications of those which control the motion between members 21 and 22.

This control includes a data means 40 mounted to slide member 21. The data means in its preferred embodiment is an elongated member 41 having a track 42 of material on which a bit of data having a distinctive physical property with discriminator characteristics can be applied. In the embodiment to be described in detail, this track comprises a layer of a magnetizable iron oxide composition and there may be a plurality of tracks 42 laterally spaced apart from each other, all of the tracks extending parallel to axis 24. The data means is mounted in the conventional manner of template rails by brackets 43 so as to be spaced from the apron of the slide member and movable therewith.

It will be appreciated that each datum could be represented by an individual permanent magnet positioned like a trip dog or cam for actuating a limit switch, and principles of this invention utilized. Such an arrangement is shown in FIG. 11, wherein a screw 225 is mounted to the member which is to carry the data means. Data means 226 includes a threaded, non-magnetic nut 227 which is engaged to the screw so that turning it shifts the data means along the screw to a desired datum location.

The nut carries a ring magnet 228 which is radially-magnetized with one pole 229 exposed as a sharp edge at the periphery of the nut, and with its other pole 230 at the inside of the ring. The force lines 231, 232 are shown, and provide a region of magnetic flux on each side of the central, null position, i.e. the location of pole 229 which condition, of course, extends all the way around the ring magnet. This provides a pulse indication, which will be read out by a Hall-effect magnetic head moved parallel to the screw as a discriminator curve.

A static-reading sensor means 44 is mounted to the other of said members, in this case to ways member 22, it being recognized that it is relative motion between the two members which is effective as to relative motion between means 40 and 44, and that the selection of which of the members the respective means is attached to is immaterial. The data means and the static-reading means will be discussed in further detail below.

Similar data means 45 are shown mounted to ways member 22 and extending parallel to axis 26, while a similar static-reading sensor means 46 is attached to base member 25. Means 45 and 46 will be effective to control relative motion between members 22 and 25, and means 40 and 44 will be effective to control relative motion between members 21 and 22. There is thereby provided data means and power means for effecting motion of the slide member over a plane normal to that of FIG. 1 and inclusive of axes 24 and 26. It will be recognized that each of the members mounted to the other is respectively slidable along its respective axis but not laterally thereto.

In this machine tool control, there will be a data means fitted for each axis of motion which is to be controlled by a programming unit (to include vertical motion, quill position, etc.) and a sensor means for each of these data means. The sensor means will of course be in direct adjacency with the data means and will remain so during the respective movements. If a discriminator signal in the form of some class of data is written upon the data means (hereafter for convenience it will be spoken of as a magnetic signal, it being understood that other types of data may be employed instead), then it will be written relative to some datum location at which it is desired to bring the device to rest. If a number of tracks are provided in each of the data means, they may be read selectively by one or more recording heads or by different channels of a multiple channel head. In the device as indicated, means is shown for moving a single channel head from track to track, but it will be understood that known switching techniques may be utilized to switch from channel to channel of a rigidly mounted head.

This invention has the feature that because the motive means (motors 28 and 29) may be controlled by an external programing signal, it is also possible to control the maximum rate of motion, which means that the feed rate then may be controlled from a programing unit.

As one example of the objectives sought by this machine, a part 35 (sometimes called a workpiece) is shown which it is desired to cut by cutter 34. It is intended for the cutter to go from position A through positions B, C, D, E, F, G, H, and then drill holes I and J. It will be noted that in data means 42, tracks X1–X4 are provided, while in data means 45, tracks Y1–Y6 are provided. It will be noted that there is a lateral (axially-aligned) correlation of position between datum locations such as datum location 48 on track Y6 which is typical of all other datum locations where allowance is needed for the radius of cutting tool 34. In each instance, the datum location will correspond with the center of rotation of the cutting tool along the axis in which its motion is to be arrested (at the datum location).

The two motions of the table are identified as X axis and Y axis, these being axes 24 and 26, respectively. If it is desired to initiate the cut at the position marked A, the programer should select track X1 and Y6 so that when the control is operated, the table motors will then bring the table and the cutter head to rest in the position corresponding to that marked A. If the Y axis reading head is now switched from track Y6 to Y1, the motors will proceed to bring the table to a corresponding position, that is, motor 29 will have operated while motor 28 remained immobile so that a straight cut would be made. This will carry the cutter in the direction shown from A toward B. When the table has positioned itself according to the Y1 track, it will come to rest. If the programer then switches the reading head which controls the crossfeed motion from track X1 to track X3, the control system will cause motor 28 to move the table in such a manner that the cutter will move from B toward C, coming to rest at C when the table is positioned at the datum point relating to the data on the X3 track.

Similarly, motion from C to D may be initiated by switching from track Y1 to Y3, motion from D to E by switching from track X3 to track X4. Continuing in this manner, the cutter may be programed around the outline of the part depicted such that it returns to rest at point A. Points I and J which depict drill holes may be reached by selecting track X2 in combination with track Y5 and Y2, respectively. It is obvious that vertical motion of the cutter head which must occur in order to pass over the workpiece to the hole location may be accomplished either by a similarly programed tape device or manually at the time. Such other controls have been omitted from this specification for the sake of simplicity, these forming no part of the invention.

It is also apparent that the same track may be used more than once, since any number of marks may be written on a track, provided that the program is such that when this track is selected it is not required to pass some mark without stopping the table motion at that point, and this will merely require switching back to this track whenever a datum location on that same track is desired. For example, the mark on Y4 could have been written on Y3. This will be more fully understood following explanation of circuit action.

From the foregoing it will be evident that it is possible to construct a machine tool having a control with numerous advantages over the current state of the art, especially with respect to the numerically controlled field. The user has the option of removing the data means (magnetic track or other) from the machine after the completion of a run and storing it as a piece of tooling. Also, he has the option of simply erasing the track and using the same media in the next setup to record the marks required to cause the machine to produce the next part. The data recorded on the magnetic tape may be rewritten as required at any time while it is installed and in use on the machine, which is an advantage inherent in the use of a magnetically recorded signal. It is also possible to write these positions on the tape by reference to a master part which it is desired to reproduce if an indicator is installed on the head. Therefore, the use of an intermediate conversion from a part to numerical dimensions, and then from a numerical program back to an analogue position is eliminated. This greatly simplifies the problems of establishing programs for numerically controlled type devices. Trimming devices are readily incorporated in this machine by simple electrical signals in a manner yet to be described.

A feature of using a magnetically-recorded signal, which is also attainable with certain other classes of signals, is the ability to record a signal that is read out as the desired discriminator curve of the data itself. It is customary to orient magnetic recording heads in a manner such that the air gap is perpendicular to the direction of travel relative to the tape. Using standard recording techniques, a pulse may be recorded on the tape such that as read by the Hall effect head it appears as a typical discriminator curve centered about the point it is desired to position to. Because of the relatively small dimension of the air gap of the head in the desired direction of resolution, an output signal of steep slope may be obtained which gives a well-defined null-balance point. This provides a nearly ideal type of discriminator curve from the standpoint of accuracy and signal-to-noise ratio and one which is readily applied to the device. It may have a proportional region too narrow for some servo systems, however, but may still be utilized by incorporating a device to produce relative motion of head and mounting.

The foregoing will be more fully understood by reference to FIG. 3 which shows the presently preferred physical embodiment of a sensor means and its mounting for use in this invention. A bracket 50 is shown which is mounted to ways member 22. A lead screw 51 is rotatably mounted to the bracket 50 and turns in a nut associated with a movable mount 52. A selector motor 53 is operatively connected to turn the lead screw and has leads 54, 54a by which electrical current may be applied to the motor reversibly to drive the same to move the mount up and down along the bracket. It will be noted that data means 40 is adjacent to the bracket and, more particularly, is directly adjacent to a combination recording and reading head (sometimes called "sensor means") 55. This is a typical recording head with a gap 56 and of the static-reading type such as a Hall-effect head, an example of which is shown in Reis Pat. No. 2,866,013. The connections and windings of this head are not shown in FIG. 3 because they are completely standard.

The head itself is mounted to a mounting block 57 that is mounted to mount 52 by parallelogram linkage 58 (sometimes called "shifting means"), the parallelogram linkage consisting of a pair of arms pivotally joined to the mount and to the mounting block. Therefore, lateral motion of the parallelogram linkage will move the gap along the tracks in the same direction as the associated table slide motion. Because this involves only small angle motions, and because the parallelogram arms are quite long, the distance by which the gap will be laterally withdrawn from the tracks will be inconsequential or may be compensated by a spring (not shown). However, the gap will continue to remain directly aligned and facing directly toward the respective selected track.

A sensor servo motor 59 which comprises a variable force bidirectional torque motor is connected to the linkage so as to swing it back and forth in order to establish the location of the gap relative to the mounting block. A readout means 60 comprising a linear potentiometer or linear voltage differential transformer is connected to the mounting block so as to provide an indication of the relative position thereto. The body of a potentiometer is connected to the mount and its core or slider 61 is connected to the mounting block. Leads 62, 63 are connected to the sensor servo motor, and leads 64, 65 and 66 are connected to the readout means. It will now be seen that the gap of the sensor head may be moved axially along the tracks and the position attained by the gap may be read as a signal from the readout means 60. Furthermore, it will be noted that the lead screw provides a means for selecting between tracks or channels, and that this is equivalent to the use of a multiple channel head utilizing electrical switching between the various channels of the head.

The ability to move the sensor head with respect to the track independently of the table motion has three advantages: (1) it facilitates the stabilization of the servo system as a whole; (2) it facilitates the writing of the desired data on the track; and (3) it provides a means of introducing a trim input if one is attempting to achieve high accuracies or to compensate for minor variations in cutter diameter. These three considerations will be discussed later.

A suitable servo loop for controlling the motion of the slide member is shown in FIG. 5, this being shown only for the members 21 and 22, it being recognized that similar circuitry will be provided for each other axis which is being controlled. This employs hydraulic motor 28 which is responsive to an electrical signal by means of an electro-hydraulic servo valve. It will be appreciated that other types of servo systems may be used and that the principles of this invention will apply equally well.

The hydraulic system shown is familiar to persons in the art. It utilizes a four-way spool valve 70 which has an outer sleeve 71 and an inner spool 72. The sleeve and spool are in sliding fluid-sealing contact with each other and are appropriately grooved in order to control flow from a pressure supply conduit 73 through one or the other of conduits 30 and 31 back to one or the other of exhaust conduits 74, 75. The selection of which, if either, of conduits 30 and 31 is under pressure and the other under exhaust, or both at equal pressures so there will be no net flow, is determined by the axial position of the spool in the sleeve. In the illustrated position, the spool is in its central, neutral position and there is no net flow through the valve. Flow will be obtained in one direction by moving the spool to the right, in which event pressure will flow from conduit 73 to conduit 31, will be expelled from the left-hand side of motor 28, through conduit 30, to return to exhaust conduit 75. Were the spool shifted to the left instead, then pressure would go from the supply conduit 73 to conduit 30 and would return as exhaust from conduit 31 to exhaust conduit 74 which would provide for reversal of the motor.

The speed of the motor is a function of the axial distance the spool is shifted from its neutral position. A power supply system includes a reservoir 76, a pump 77, a pressure regulator 78, and a motor 79 driving the pump. The pump withdraws fluid from the reservoir, and the pressure regulator and the exhaust conduits return fluid thereto. The shifting of the spool in the sleeve is accomplished by a conventional torque motor 80 with a permanent-magnet field and wound control winding, which receives a current whose magnitude and polarity are derived from a servo amplifier 81, which amplifier in turn derives its signal from sources yet to be described. Suffice it to say that the resulting shift of the spool in the sleeve is proportional to and in the direction applied to motor 80 by amplifier 81. The remainder of this discussion will relate to the control of the position of motor 80 and its association to the axial position of the sensor means 44 relative to the respective data means.

With further reference to FIG. 5, a feed rate signal derived from a program recorder via the circuit of FIG. 6 is applied at input terminal 85. This will be of constant polarity, with magnitude proportional to the desired feed rate. The amplitude of the signal will be determined by the programer by means yet to be discussed, and it is this signal which determines the amplitude of actuation of motor 80. This signal does not, however, determine the direction, and for this purpose a bias input terminal 86 is provided at which the programer provides a signal of one polarity or the other to a feed direction selector circuit 87 at its input terminal 88. This selector terminal includes appropriate diodes and a pair of relays 89, 90, the respective one of which will close depending on the polarity of the signal applied to terminal 86.

The feed rate signal as applied at input terminal 85 proceeds through a pair of operational amplifiers 91, 92 (each of which reverses signal polarity) to a pair of feed rate output lines 93, 94 which are connected to relays 89, 90 respectively. These in turn are connected to a mode switch 95 (shown in its normal or unactuated condition) which has a pair of selector terminals 96, 97 and a common terminal 98. In the normal condition, terminals 97 and 98 are interconnected and receive the feed rate signal adjusted for its polarity from whichever one of relays 89, 90 is closed. Terminal 98 is directly connected to servo amplifier 81 so that the magnitude and polarity of the signal which appears at terminal 98 determines both the direction and the physical extent of shift of motor 80 and of the spool 72 within sleeve 71 and thereby the direction and rate and operation of motor 28.

When the device is started, the foregoing two signals are all that are required to establish the rate of table motion and the direction. It will be noted that the signal at terminal 98 is also conveyed through line 99 to a servo amplifier 100, that in turn is effective to provide motive current to sensor servo motor 59. A damping network 101 is connected in parallel relationship to servo amplifier 100, and potentiometer 60 provides its readout signal also to the servo amplifier. If it is assumed that the recording head is as a result of the foregoing signals and connections moved away from any data on which it may have been previously positioned (if there is such data on the track), then the table will continue to move in the selected direction at the selected feed rate until something terminates this action.

Inherent in a desirable discriminator signal as obtained from the magnetic recording media and sensor head or other suitable devices is a change of polarity (or phase) of the signal which occurs when passing through each null (datum) point. The bias signal will as described always indicate the desired direction of motion, and the signal obtained from the reading head will provide an indication of the polarity of the signal from the track as it is recorded in the region to which it is directly adjacent. Therefore it will be necessary to be able to reverse the sense of the servos, and it follows that by the use of appropriate logic the required directional sense of the servo may readily be determined.

A comparator and logic unit 105 is connected by lead 106 to the outputs of relays 89 and 90 so as to monitor the feed rate signal. It is also connected to the output of a pre-amplifier 107 so as to monitor the output of the recording head as received from a polarity reversal switch 108. This polarity reversal switch has the property of reversing the polarity of the output of the head without changing its amplitude and is under direct operative control of the comparator and logic unit. The function of the comparator and logic unit is to compare the polarities of the feed signal and of the output of the pre-amplifier. When the sensor head detects a discriminator mark (data) on the track, a signal will appear as an output of the pre-amplifier and is supplied to the comparator and logic means. If the polarity of this signal is the same as that of the feed signal, then the system is operating in a proper and stable sense. If, however, the output of the pre-amplifier 107 is of opposite polarity to that of the feed signal, it indicates that the unit as it stands is operating in a reverse sense and would become unstable if the signal input were further used, as by using it to close the servo loop. Under such circumstances the comparator and logic unit 105 will cause the polarity reversal switch 108 to operate in order to bring the output of the signal pre-amplifier 107 to the same polarity as that of the feed signal.

Once the output of the signal pre-amplifier is of the same polarity as the feed signal and has reached some specified fraction thereof (which in practice might be three-quarters of its magnitude) the comparator and logic unit 105 will then cause relay 110 to operate, which actuates mode switch 95 to switch over from the illustrated connection to connect instead terminals 96 and 98, thereby disconnecting the previous input to servo amplifier 81 (the feed rate signal as provided by the programer) and substituting a signal derived from the sensor means. A pair of diodes 111, 112 are provided which clip the input to terminal 96 to a magnitude which does not exceed that of the feed rate input. The servo will now operate to position the gap over the datum point on the track, operating at a table speed which does not exceed the feed rate which is limited by the signal from the programer by means of amplifiers 91 and 92 and diodes 111 and 112.

It will be appreciated that the discriminator curve obtained from a typical high quality Hall effect recording head may be of only a very few thousandths of an inch in width. From the standpoint of system accuracy, drift, signal-to-noise ratio and such, this is highly desirable. From the standpoint of servo system stability, however, it implies that a system capable of very high accelerations would be required if the table were to be brought to rest from a substantial speed rate in such a short distance. It is therefore appropriate to provide a mechanism whereby the proportional range of the servo system may be extended. This is accomplished by the simple means shown, and overcomes many problems of the prior art by use of motor 59 which displaces the sensor means in the direction of its longitudinal motion. This is a preferred feature of the invention and is not required in order to enjoy the other benefits of the invention. However, it is a substantial advantage to be able to smoothly decelerate a device such as this. Briefly stated, this is accomplished by displacing the sensor means (or the data means, should this be more convenient) so as to shorten the distance between them when the table is in motion so that the sensor means will arrive at the data or datum point before the machine tool member which carries it arrives at its corresponding datum location.

The foregoing shift gives an anticipation of arrival at an ultimate destination which enables the system to utilize the remaining relatively short distance of travel to decelerate the device. Thus, adjacency of the data in the sensor means will occur before the two machine tool members have reached their ultimate relative alignment. Before arriving at this position the machine will have moved at its established feed rate, and thereafter at a lesser rate determined by the sensor and its pre-amplifier. Then the table may be brought to rest smoothly and without overshoot and without the necessity of providing high acceleration servos or specially high frequency responses.

Motor 59 is a typical torque motor or linear motor, such as is used in electro-hydraulic servo valves. It could also be of a typical loudspeaker voice coil construction with a signal coil immersed in a strong permanent magnet field. This is a short stroke device capable of fairly high frequency response. The potentiometer 60 is provided to supply a feedback of the position of the sensor head relative to its mounting. It will be appreciated that a linear potentiometer or an LVDT could be used here. The servo amplifier 100 is a high gain amplifier and serves to displace the sensor head with respect to its mounting by an amount which is proportional to the input signal, which is conducted to it via line 99. The damping network 101 provides necessary frequency response characteristics required to stabilize the system.

It will now be seen that when operating in this mode (terminal 98 connected to terminal 96) there is provided a proportional servo system which functions to bring the table to rest at the point at which the datum recorded on the track coincides with the null position of the sensor. During the final approach to the datum point the table velocity is proportional to the remaining distance which is to be traveled. The use of motor 59 to displace the sensor means with respect to the datum permits the table servo system to be designed with a sufficiently large proportional region to be applicable to large, heavy machine tool tables.

It will be appreciated that a system could be built in which both the displacement of the sensor head and the motion of the spool 72 in the hydraulic servo valve controlling the motion of the table could be effected by the same motor (59 or 80). With such an arrangement the table would approach the datum point in such a manner that the velocity was proportional to the remaining distance to be traveled in the customary manner known to the servo art. There are, however, advantages to separating these functions. One is the opportunity to obtain higher performance by insertion of amplifiers and feedback networks of different characteristics appropriate to the two different functions, and the other is the ability to introduce an independent trim or bias. The bias function simplifies programing by enabling the head to be moved clear of any datum upon which it has previously been positioned when starting to make another cut.

A trim adjustment feature, that is, means to selectively displace the null (at rest) position of the sensor means, is shown in box 120. It includes a trim select input terminal 121 which would receive a trim select signal from the programer which provides by its polarity for the selection of either of two trim voltages by the selective actuation of one or the other of relays 122 and 123. These are respectively connected to potentiometers 124 and 125 which may be set to different values corresponding to a left-hand and a right-hand bias, for example. This bias would normally be selected by an input from the programer by means of the polarity of the signal applied to terminal 121.

The potentiometers are connected across a source of reference voltage 126 and the output is supplied via operational amplifier 128 to line 99 from which it is added to the signal to servo amplifier 100 in order to have its effect on sensor servo motor 59. Trim meter 127 provides a readout means for the value of the trim signal. It will be appreciated that multiple trim adjustments could be provided if desired, and selected by the programer. These provide the ability to trim to a precise dimension of the part, or to compensate for limited variations in cutter diameter.

A null detector 130 is connected by lead 131 to terminal 98 where it is responsive to all signals, and determines when a null condition exists in the system signalling the end of motion. It then sends its own signal to the programer which would signal the end of a cycle and cause the programer to step to the next sequence.

It will ordinarily be expected that the machine will be set up by applying the necessary discriminator (data) marks which form part of the program on the magnetic tracks while it is on the machine. Even under those circumstances wherein the data means are removed for storage as a piece of tooling, it will be necessary to record the original program on them. It is possible to accomplish this recording while on the machine tool to which they are installed, as well as by using auxiliary equipment. Three common forms of data input which may readily be used are the following: (a) a master part which may be followed and the discriminator marks applied with the machine tool positioned; (b) a pattern inscribed on a template as a similar type of reference; and (c) by positioning the machine tool according to measurements such as by measuring its motions. In the case of the use of the template or master part, it is anticipated that a spindle microscope could be installed in the spindle of a milling machine and a pair of gauge blocks could be wrung together, chosen such that one of the gauge blocks represented the radius of the cutter. Similarly, a gauge could be made for the purpose. The gauge could then be held against the edge to be machined, the table then moved until the joint between the gauge blocks (or the mark upon the gauge device) was visible under the cross-hair of the spindle microscope and the operator would then actuate the write function yet to be described which would place upon the selected track data defining that particular spindle position (datum location). Similarly, the spindle could be centered over the various holes desired (by the use of the spindle microscope) and datum applied in positions corresponding to these hole locations.

The foregoing are simply some of the many means of applying data to the data means. It is evident that this invention includes the capability of preparing the data means for table positioning on separate equipment entirely independent of the machine tool upon which it will be used. Alternately, the data means may be prepared while installed on the machine on which it is read-out in use. In either event, it is desirable to provide the machine with a re-write capability so that errors may be corrected or modifications be introduced into the program as it goes along. Sensor devices utilizing the Hall effect principle may be built to incorporate conventional writing and erase coils, and can thereby record original or revised data, and erase it as appropriate. These functions may be manually selected by the operator and accomplished by appropriate circuitry.

If it is desired to re-write a track, for example, it is first necessary to erase the previous data by actuating an erase signal and then use a manual input to the table servo (not shown) to cause it to traverse the portion of the tape that it is desired to erase. To re-write the track, the table would be positioned to the desired point. Positioning the table in this manner can be done by utilizing any of many sorts of accessory table readouts such as indicators or optics associated with the machine. Having positioned the table, the operator will actuate the write command in response to which a function generator will produce the necessary signals to the combination recording/sensor head and to the torque motor 59 that positions the head. In accomplishing this the head will first be displaced axially to one side and then the writing signal input will be varied appropriately as the head passes through the null position and is displaced on the opposite side. A pulse is written on the tape, such that when read out by the Hall effect head the result is a discriminator curve centered about the null (datum) point. This is the same technique as would be used in the original recording of data.

A circuit suitable for accomplishing this objective is shown in FIG. 8. The salient elements from FIG. 5 are shown in FIG. 8 and the additional elements comprise a write amplifier 150 which receives its signal from a function generator 151 which is actuated by a write command signal 152 which may be initiated manually. Its signal is applied to the recording winding in head 55 and thereby to the data means 41. Motion of the head during this process is accomplished as before by motor 59 which is under control of a signal derived from the function generator. The details of the circuitry of the function generator are unnecessary to an understanding of this invention, it only being noted that it both provides a signal of appropriate magnitude and polarity to the recording head and also actuates the motor 59 to move along the tape as it applies the signal thereto. This enables a signal which otherwise would require relative motion between the two machine tool members to be derived with the members locked in their predetermined datum null position by the simple expedient of moving the head along the track by the shifting means.

This data completes the discussion of the operation of the loops which enable the data means to be prepared and utilized. While the programer is not a part of this invention and numerous types of programers may be utilized, it is believed useful to show a schematic of typical interface circuitry which might be found useful in connecting the output of a recording device to the circuitry of FIG. 5. Such a device is shown in FIG. 7. An "axis select" input may be secured from a program recording device such as a standard punched paper tape or a magnetic disc and be applied to a buffer storage 160, the buffer storage means being adapted on command to operate banks of switches 161. These operate to select the appropriate axis, table, quill or other machine element it is desired to move. A four-pole four-position switching device is shown (161) although it will be appreciated that in some systems more poles and more or fewer positions may be required.

In order to utilize the principles of this invention and operate an axis of the machine accordingly, several functions must be appropriately interconnected. Some of these are shown in FIG. 7. If a single sensor head is used in such a manner that it may be positioned over any one of a number of multiple tracks, it becomes necessary to select which track is required for the next motion to be made by the machine. Sections A and B of switch 161 are arranged to connect the servo motor and the position feedback potentiometer to the appropriate servo amplifier and inputs. Track select inputs obtained from the punched paper tape or other program recording device are loaded into buffer storage 163, which in turn operates the digital to analog converter group 166 which translates these digital inputs into an analog voltage representative of the desired position of the sensor head with respect to the track.

Servo amplifier 167 controls motor 53 which operates to position the sensor head adjacent to the selected track. The position of the sensor head is detected by feedback potentiometer 169 and servo amplifier 167 causes motor 53 to operate until a condition of balance is attained such that the voltage from the slider of potentiometer 169 is equal and of opposite polarity to the voltage obtained from the digital to analog converter 166.

Similarly, section C of switch 161 is used to address the bias signal to the appropriate axis of the machine. The polarity of this signal determines the feed direction and its presence initiates motion in a manner previously discussed with regard to the circuit action of FIG. 5. Similarly, section D of switch 161 is adapted to address the "trim select" input to the axis which it is desired to use. The polarity and presence of a signal serve to connect the corresponding trim input into the servo circuit, this selection being made in response to a signal from the tape, magnetic disc or other recording media. The trim adjustments, shown as potentiometers 124 and 125 in FIG. 5, remain under control of the operator.

The arrangement just described provides for the common use of data channels and various other peripheral equipment. The other three terminals shown associated with each section of switch 161 would be similarly connected to corresponding elements in other axes of the machine, for instance, sections A and B would connect to the servo motors and feedback potentiometers that position the sensor heads with respect to the other axes of the machine, so that the associated servo amplifier, buffer and digital to analog converter could be used sequentially in conjunction with each table motion of the machine. The null detector 168 determines when motion of the associated servo has ceased (that is, when track select is complete) and provides a signal to the tape transport or other recording device. This enables the programer to advance the tape or disc, if required, and initiate the next readout and programing function which might include establishing the feed rate and energizing the "apply bias" signal by closing contact 164 which would then initiate appropriate table motion in accordance with the operation of FIG. 5.

In FIG. 6 means is shown for providing the appropriate feed rate inputs which comprise a bank of programer operated switches 170, operative to select which one or more of a group of summing resistors 171 will be connected in circuit with a reference voltage thereby to provide a feed rate signal of predetermined voltage relative to the reference voltage.

This device thereby provides a system wherein a machine tool may be operated at some predetermined feed rate until it reaches some datum point at which it will be stopped. It provides an optional means for smooth deceleration of the machine tool by anticipation of its arrival at some datum point. It furthermore offers the opportunity for broad programed operation. This has been disclosed in connection largely with similar motions on all axes but it will be recognized that it is just as proper to provide any of the axes, full or part-time with other classes of control, such as either manual or tracer-controlled. In brief, this is a point-to-point positioner with new and novel means for determining the arrival at a datum location and for providing, if desired, means for smooth and ready deceleration of the machine tool as it nears its datum location.

In the interest of clarity and simplicity the device has been described as though all motions and circuit adjustments were taking place individually, one at a time. In a practical machine it is entirely feasible, of course, to have one or more actions occurring simultaneously. For example, it is possible to make the selection of the next data means and sensor means while some axis remains in motion, provided of course that the null of the associated servos is sufficiently stable that no drift will be produced thereby and that the next motion is in an axis other than the one currently in motion.

The use of magnetic or optical data recording means has distinct advantages over devices presently known for data storage such as perforated tape as suggested in many numerical-control systems. This system does not require digital encoders to be associated with the various machine motions, nor does it require the supporting circuitry normally associated therewith. The data may be altered in use by writing over the recording media, which facilitates immediate error correction in the shop without the need of requesting a re-punched tape from a programing facility.

The terms "sensor means" and "data means" have been used in a broad sense throughout this specification. The intended connotation is that the output have a discriminator feature. For example, in FIGS. 9 and 10 there are shown data types which do include this feature. FIG. 9 is a positive pulse 200 with a point of inflection 201 at datum point 202. FIG. 10 is a pulse 205 which has a value charging from positive to negative at datum point 206. Actually, the curve of FIG. 9 representing a recorded pulse is read out as the discriminator curve of FIG. 10 by a Hall-effect head.

An equivalent system is that of an optical device wherein a datum point is located as the interface between a transparent and opaque region, with an optical head whose readout signal changes phase or polarity through some null value as a greater or lesser area of opaque or transparent region lies in its field.

The foregoing are readily distinguished from such known units as conductive probes or styluses which sense a conductive versus a non-conductive system. In these devices there is no discriminator feature. There is either conduction or not, and this fact (or signal) is not unique to a closely determined point. Mere conductivity does not constitute a basis for a discriminator curve, because once it is established, then the same signal is derived over a large region. The use of data-sensor systems which give quantitative signals representing the displacement on either side of a datum point provides an advantageous input for servo use.

In addition to Hall-effect heads, one might instead use magneto-resistive devices or reluctance bridge devices. In every case these will be static-reading devices in which a reading of condition can be secured without requiring relative motion between the machine tool members.

This invention is not to be limited by the embodiments shown in the drawings and described in the description, which are given by way of example and not of limitation, but only in accordance with the scope of the appended claims.

I claim:

1. In combination with a machine tool which includes a ways member and a slide member, the slide member being mounted to the ways member for motion relative thereto along an axis, but not laterally thereto, the said motion affecting the relative position of a cutting tool and a workpiece along a parallel axis, and motive means for causing said motion of the members; data means carried by one of said members which includes a body adapted to carry data in the form of a detectable physical property at a selected datum location thereon the said datum location being uniquely indicative of a relative position between the members, a static-reading sensor means carried by the other of said members so disposed and arranged as to move in adjacency to said data means when the members are relatively moved, and adapted to sense the adjacency of said data, and to provide a signal indicative of said adjacency of data, the data means and the sensor means being cooperatively adapted to provide a readout signal of the discriminator type; control means responsive to said readout signal for controlling the said power means in response thereto; and a shifting element mounting one of said means to its respective member so the sensor means and data means are shifted more closely, together, whereby to anticipate the adjacency of the sensor means to the datum location, and control circuitry means effective on the motive means and on the shifting element to return the shifting element to the datum location, and to decelerate the member such that its velocity is proportional to the distance from the desired point of rest as defined by said datum.

2. A combination according to claim 1 in which the data means comprises an elongated track of magnetizable material.

3. A combination according to claim 2 in which the sensor means is a Hall-effect head.

4. A combination according to claim 1 in which the data means comprises a magnet having a flux flow on each side of the datum.

5. A combination according to claim 4 in which the sensor means is a Hall-effect head.

6. A combination according to claim 1 in which the data means comprises a plurality of elongated tracks of magnetizable material, and in which selector means is provided which is adapted to cause said sensor means to respond to any selected one of said tracks.

7. A combination according to claim 1 in which the data means includes a plurality of tracks adapted to carry said magnetic signal, and in which selector means is provided which is adapted to cause said sensor means to respond to any selected one of said tracks.

8. A combination according to claim 1 in which the data means and the sensor means are cooperatively adapted to provide a readout signal of the discriminator type.

9. A combination according to claim 1 in which the sensor means is the shiftable one of said means, and in which the sensor shifting element comprises a mount supporting the sensor means for motion in an axial direction relative to its respective member, and a motor for so shifting the sensor means on its mount.

10. A combination according to claim 9 in which the data means and the sensor means are cooperatively adapted to provide a readout signal of the discriminator type.

11. A combination according to claim 9 in which the data means includes a plurality of tracks of magnetizable material, and in which selector means is provided to cause said sensor means to respond to any selected one of said tracks.

References Cited

UNITED STATES PATENTS

| | | | |
|---|---|---|---|
| 2,522,240 | 9/1950 | Sias | 318—28 XR |
| 3,199,630 | 8/1965 | Engel et al. | |
| 3,202,895 | 8/1965 | Arp et al. | 318—28 XR |
| 3,246,219 | 4/1966 | Devol et al. | 318—28 XR |

BENJAMIN DOBECK, Primary Examiner

U.S. Cl. X.R.

318—162